Nov. 21, 1944.        G. D. ARNOLD         2,363,282
TEMPERATURE CHANGING DEVICE
Filed June 22, 1942

INVENTOR
GERALD D. ARNOLD
BY
Wheeler, Wheeler & Wheeler
ATTORNEYS.

Patented Nov. 21, 1944

2,363,282

UNITED STATES PATENT OFFICE 2,363,282

TEMPERATURE CHANGING DEVICE

Gerald D. Arnold, Wauwatosa, Wis.

Application June 22, 1942, Serial No. 447,934

10 Claims. (Cl. 83—93)

This invention relates to improvements in apparatus for changing the temperature of a finely divided product in the course of its transportation and other treatment. Reference is made broadly to a device for changing temperature because, although the principal utility of the device lies in the field of refrigeration, it is also useful for heating rather than cooling the material treated.

The present application is a companion to my application 311,639 filed December 29, 1939 (Patent No. 2,266,292 granted December 16, 1941) and also to my applications 361,807 filed October 19, 1940 (Patent No. 2,318,576 granted May 11, 1942); 387,125 filed April 7, 1941; 413,320 filed October 3, 1941; and 443,739, filed May 20, 1942. These various companion inventions pertain to the art of preserving valuable elements of organic materials and, although the present invention is not so limited, it will be described with particular reference to that field.

It is the primary object of the invention to provide apparatus in which energy involved either in the heating or cooling of the product treated is conserved. More specifically, as applied to the field chosen by way of exemplifying the invention, it is my purpose to provide apparatus in which organic material is comminuted or ground in a mill, is thereafter conveyed pneumatically and delivered through a separator, and is thereafter chilled by a current of refrigerating air which is made to move in counter-flow past the material to be treated and thence back to the mill, the refrigerated currents being there used to provide for the pneumatic propulsion of the material from the mill to the point at which the final chilling operation is performed.

It is a further object of the invention to provide for the elimination from the material of atmospheric air of undue warmth or hot gases which may previously have been used in dehydration and to supplant such air and gases with a chilled current of refrigerated air in direct and intimate contact with the finely divided particles of material to be cooled thereby. It is preferred that regardless of any number of intermediate operations to be performed upon such material, heated atmospheric air will be continuously excluded from such material. While this is not essential it is desirable to my purpose.

There is an important advantage in direct contact of the refrigerated air with the material to be cooled thereby. If refrigeration is merely applied externally to conduits through which the material is passing, condensation occurring on the walls of the conduits will wet the material. Where the refrigerating gas directly contacts the material, exactly the opposite result is obtained. The pre-cooled air, even though saturated at the temperature to which it is initially cooled, becomes very dry as it receives heat from the work material, its dryness serving to further evaporate any remaining moisture from such material. Once the material is thoroughly chilled, any contact of warm air therewith tends to cause condensation directly on the surface of the material. By excluding atmospheric air and other gases from the material after chilling is commenced, I am able to almost entirely eliminate this undesirable moistening of the work.

Other objects will be apparent to those skilled in the art upon examination of the following disclosure of the invention.

In the drawings.

Like parts are identified by the same reference characters throughout the several views.

Figure 1:
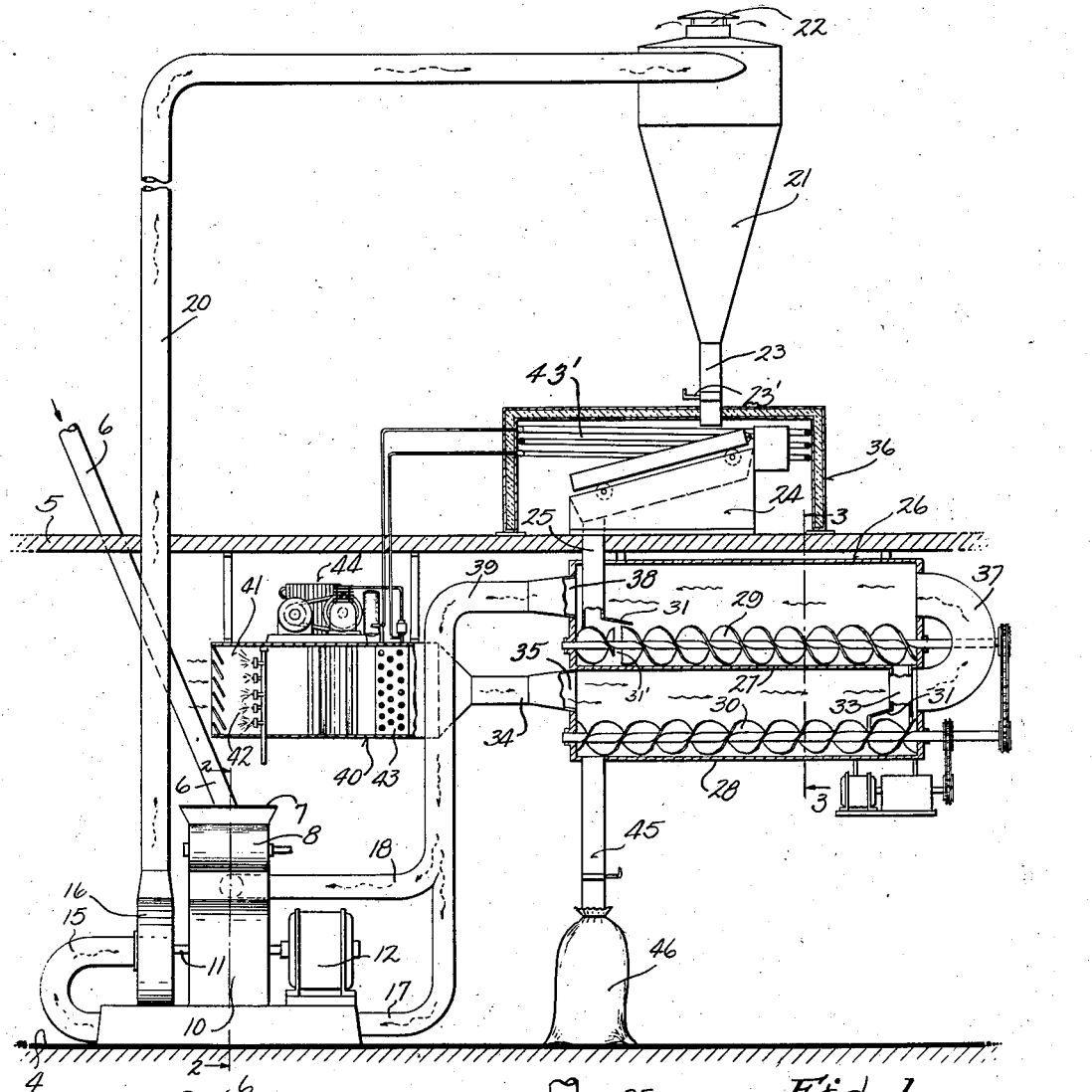
Fig. 1 is a diagrammatic view partially in side elevation and partially in section showing apparatus embodying the invention.
Figure 2:
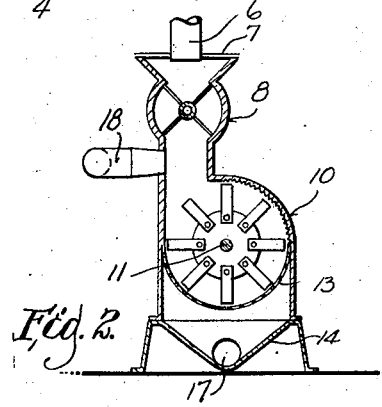
Fig. 2 is a detail view in section on line 2—2 of Fig. 1.

For purposes of illustration the apparatus embodying the invention is shown incorporated on two separate floors 4 and 5, which are merely indicated diagrammatically. The incoming material to be treated passes through a chute 6 through the cover 7 of a conventional charging valve 8, whereby the material is entered into the hammermill 10. The regulated movement of the material into the hammermill, as controlled by the charging valve at 8, tends to maintain a column of material in the pipe 6 whereby such material is packed sufficiently closely in the pipe to tend to eliminate quite largely from the material any hot air or gas which may be entrained therewith.

The main hammermill shaft 11 driven by motor 12 carries the conventional rotor which comminutes the material against the screen 13 and the material thereupon drops into the trough-like base 14 of the mill where it is picked up by a pneumatic current established from the casing of the hammermill through pipe 15 to a centrifugal blower fan 16 operated by the extended shaft 11 of the hammermill. For some purposes the hammermill may not be required, in which case it may be omitted completely, only the blower being used to pick up the material admitted by the charging valve and to deliver it pneumatically.

As will hereinafter be pointed out, the air admitted to the hammermill through the pipes 17 and 18 has been chilled and is a refrigerating medium left over from the final refrigerating steps to which the material is subjected after leaving the hammermill.

The refrigerated and partially reheated air pneumatically delivers the comminuted material from the base of the hammermill through the conduit pipe 20 to a centrifugal or cyclonic or other separator 21 having an air vent at 22 and a discharge spout 23 for the treated material. The material issuing from the separator may, if desired, pass through a sifter which is designated by reference character 24 and may be of any conventional design. In fact, the use of the sifter is optional.

For reasons above noted, the circuit preferably includes a refrigerated room or chamber 36 which, regardless of its size, in effect may constitute a part of the continuous conduit means in which the material is enclosed during its transit through the apparatus to exclude atmospheric air or other unduly warm gases. The fact that the control valve slide 23' is located near the lower end of pipe 23 tends to keep such pipe reasonably full of material whereby the material is separated at this point from the somewhat warmed air which has pneumatically conveyed it to the separator 21. Elimination of this partially warmed air from the separator and the apparatus, as well as from the material, is of assistance in that it prevents dilution of the colder air into which the material is about to pass at this point.

Whether or not the sifter is used, the material to be delivered through spout 23 of separator 21 ultimately passes through the inlet pipe 25 into the refrigerator casing 26. Pipe 25 may itself constitute a treating device, elongated to any required degree with reference to the speed of movement therethrough to enable the pneumatic current to interact with the material conveyed to heat or cool such material or otherwise accomplish the desired objective of the exposure of the material to the gas. Casing 26 contains a trough 27 in its upper level and a trough 28 in its base. The conveyor screws 29 and 30 operate in the respective troughs and are driven by any suitable connections such as the motor, belts and pulleys, illustrated in Fig. 1. The end of pipe 25 is preferably provided with a shoe at 31 fitted to the trough for a slight portion of its length in order to assure the movement of all of the material within the trough before exposing the material to the blast of refrigerated air which moves across the surface of the trough. The conveyors 29 and 30, or either of them, may, by reason of their structure or speed of operation, be made to throw or toss the material into the path of the current of refrigerated air.

Beneath the shoe 31, the conveyor may be interrupted to provide the gap at 31' which, in the event that the supply of material arriving through pipe 25 is interrupted, will allow a portion of the last of such material to remain beneath the shoe 31, thereby sealing the opening against the circulation into housing 28 of air which may be at a different temperature or humidity.

The pitch of the thread of the screw 29 is such as to deliver the material from left to right as viewed in Fig. 1 and the material ultimately falls through conduit 33 into the lower trough 28 where the pitch of the thread of screw 30 is such as to deliver the material from right to left as viewed in Fig. 1. Conduit 33, like conduit 25, may have a shoe 31 confining the material about the screw at the point of delivery of the material into the trough in which the screw operates.

Figure 3:
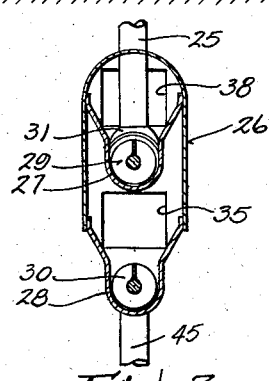
Fig. 3 is a detail view in section on line 3—3 of Fig. 1.

The air used in changing the temperature of the treated material enters chamber 26 through pipe 34. Trough 27 constitutes a partition across the chamber and at the same time is of such shape that the gases entering the chamber through pipe 34 are in full contact with trough 27 throughout its length and height, as clearly appears in Fig. 3. At the same time the gases are in full contact with the upper portions of trough 28 and the material conveyed therein by screw 30.

Entering the lower compartment of the treating chamber 26 through port 35 from pipe 34, the tempering gases leave the lower compartment through a curved pipe 37 which carries them into the upper compartment of chamber 26 at the right hand end thereof as viewed in Fig. 1. Here the gases pass over the material being conveyed by screw conveyor 29 and in intimate contact with such material and the upper surfaces of trough 27. The gases leave the upper compartment through port 38 and pipe 39 which guides the supply of chilled but partially reheated gases through pipes 17 and 18 to the hammermill above described. Any dust picked up by such gases is immediately restored to the hammermill and blower where it is commingled with other material, this being a desirable feature of the invention.

The air or other gas used in the apparatus is modified as to temperature in the tempering apparatus generically designated by reference character 40. As above explained, it is broadly immaterial whether the air or gas is heated or cooled, but for the purpose of exemplifying the invention the air tempering apparatus 40 has been illustrated as an air refrigerating device including an air washer 41 in which an initial reduction of temperature is accomplished by water sprays at 42, this being followed by an evaporator coil 43 of mechanical refrigerating mechanism generically designated by reference character 44. The same refrigerating mechanism may be used, if desired, to cool the chamber 36 by carrying refrigerant to this chamber and exposing the air of the chamber to the coils 43' wherein such refrigerant is contained.

The tempered air passing through the apparatus 40, whatever its nature, first acts on the material in the lower or delivery compartment of the treating chamber 26, then passes in counter-flow through the upper or inlet compartment of chamber 26, and thence goes directly to the beginning of the course of the treated material through the apparatus, being fed to the hammermill. The entire flow of air through the system is induced by the blower fan 16, this being a conventional part of the ordinary commercial hammermill, so that no special equipment is required if the hammermill is used. All of the air which enters the hammermill is air which has been refrigerated in the apparatus 40 but which may partially have been warmed toward atmospheric temperature in the lower and upper compartments of the treating chamber 26.

Thus far the movement of the air and the material has been counter-flow movement, but from the hammermill to the separator 21 the material to be treated is pneumatically borne by the very gases which have been modified as to temperature as above described. Thus, the temperature treatment of the material continues in the course of its pneumatic propulsion from the hammermill to the point where the material is delivered from the separator toward the treating chamber 26. Having been used first in a counter-flow arrangement and secondly in a concurrent arrangement, the temperature modulated gases are finally released from the separator. At the point of release the gases will have approached closely to atmospheric temperature and it is for this reason that it is advantageous to re-compact the material in the discharge spout 23 of separator 21, completely relieving it of the gases which effected its precooling, before delivering the material into the sharply refrigerated gases to which it is exposed in the casing 28.

Thus, substantially all of the cooling effect initially imparted to the gases by the refrigerating mechanism is usefully employed in the apparatus before such gases are released and, moreover, the cooling is accomplished in such a way that as the gases become warmed and thereby lowered as to humidity, they dry rather than moisten the product upon which they operate.

The material, reaching its maximum modification as to temperature in the gases newly arrived from the apparatus 40, is delivered through pipe 45 to a sacker which fills sacks such as that shown at 46. Here again, the ultimate disposition of material is optional. The use of the air in counter-current heat treating relation in direct contact with the material at or near the point of material delivery, followed by the re-use of the same air to impart its remaining super-atmospheric or sub-atmospheric temperature to material newly arriving at the hammermill and conveyed by such air to the separator, is a factor making for considerable economy. By the time the air escapes from the separator outlet at 22 it has preferably been restored to atmospheric temperature and in the meantime the heat modulating job which would otherwise have to be done entirely in the heat treating chamber 26, has been partially completed before the material arrives in such chamber.

Except as indicated in the appended claims, I do not desire to restrict the present invention to details of the particular apparatus disclosed, this being clearly by way of exemplification. I do not, for example, wish to limit myself to the use of a particular type of conveyor in the temperature modifying chamber 26, nor to a particular style of chamber, nor to particular apparatus for modifying temperature of the air used, nor even, necessarily, to the use of a hammermill, the latter being representative of many mechanical treating devices which may be used to act mechanically as indicated before the material is modified as to temperature.

While my system has peculiar advantages when used for refrigerating comminuted material in accordance with the specific disclosure, it will be understood by those skilled in the art that some of the advantages thereof are also obtained where the system is used for heating rather than chilling the material, no change in structure or method being required other than the heating rather than the cooling of the air or other gas admitted to the system.

I claim:

1. The combination of means for treating material mechanically, said means including a substantially closed casing having an inlet for air, an inlet for material and an outlet for air and material acted thereon, of a rotor in said casing, a blower connected with said outlet for pneumatic delivery of such material, said blower being operatively connected to receive motion from the rotor, a separator arranged to receive material pneumatically conveyed from said blower and provided with air and material outlets, a refrigerating chamber having a material inlet operatively connected to receive material from the outlet of said separator, a conveyor for moving the material through the refrigerating chamber, said chamber having a material outlet and said conveyor constituting means for delivering said material to the outlet, said refrigerating chamber having an air inlet and an air outlet, means for chilling air admitted to said chamber through its inlet and a pipe leading from the outlet of said chamber to the casing of the means first mentioned, whereby the refrigerated air which has already acted on material in said chamber not only acts on material which has not yet reached said chamber but moves with such material toward said separator as a means of propelling the material toward the separator, the material thence passing to the chamber and thence being discharged.

2. The combination with a hammermill having a blower and a casing with an outlet operatively connected for air and material delivery to said blower and with material and air inlet means, of a refrigerating chamber having air inlet and outlet means and material inlet and outlet means, the air outlet means of said chamber being connected with the air inlet of the hammermill casing, a separator having an inlet connected with the blower to receive material pneumatically carried from the hammermill, said separator having separate air and material outlets, means for carrying to the material inlet of said chamber the material delivered from the outlet of the separator, and means for refrigerating air admitted to said chamber whereby to chill the material in the chamber and the material moving from the hammermill to the separator.

3. The device of claim 2 in which the chamber comprises a plurality of conveyor troughs, conveyors operating in the respective troughs, and means for directing the refrigerated air over the material in counter-current relation thereto and in heat absorbing relation to the respective troughs.

4. The combination with a refrigerating enclosure for comminuted material provided with means for advancing the material through the enclosure, gas refrigerating means, and means for moving a refrigerated gas through the enclosure exposed to such material, of a separator having a discharge spout communicating with said enclosure and provided with a gas outlet, conduit means leading from said enclosure to said separator for gas set in motion by said gas moving means, and a material feeder discharging into said conduit in the path of gas moved therethrough whereby gas partially warmed in said enclosure is employed for the pre-cooling of material in the course of its pneumatic delivery to said separator and is finally delivered from the separator and the material after absorbing heat therefrom before such material is discharged from the separator into the enclosure.

5. The combination of a gas refrigerating casing having a gas inlet, a work refrigerating casing having a work discharge outlet, a blower casing, a separator casing having a gas outlet, conduit means connecting said casings in series in the order named, work conduit means connecting the separator casing with the work refrigerating casing, a blower in the blower casing, refrigerating means in the gas refrigerating casing, and work propelling means in the work refrigerating casing, said first conduit means including a work inlet in the vicinity of the blower casing for receiving work into the path of gases traversing said conduit means after passing through said work refrigerating casing, whereby the residual heat absorbing capacity of such gases is used to cool the work delivered into said conduit means, the blower induced gas movement from the blower casing to the separator casing being sufficient to convey the work pneumatically to the separator while cooling it, said separator comprising means for removing the pre-cooled material from the partially heated gases before delivering the work into the work refrigerating casing.

6. The combination with a pneumatic conveyor system comprising a blower and a conduit, means for introducing substantially gas-free material into such system to be pneumatically propelled through said conduit, said means including an admission member and means for packing the comminuted material therein to mechanically express the majority of its entrained gas, a separator to which said conduit leads and including a gas outlet and an outlet for said material, said separator comprising means for separating the material from the gas which has pneumatically conveyed such material through said conduit to the separator, a material refrigerating chamber, means for delivering refrigerated gas to said chamber, means for conveying to said chamber material discharged from said separator, means for guiding through the refrigerating chamber the material to be cooled by the refrigerated gas therein, a discharge spout from said refrigerating chamber for such material, and a discharge gas conduit from said material refrigerating chamber including means connecting said conduit with said pneumatic conveyor system, whereby gas which has refrigerated the material in said refrigerating chamber is used to pre-cool material en route to said separator and thence to said chamber.

7. The combination of a gas conduit means including in series a gas refrigeration casing, a work refrigeration casing, a comminuting mill casing, a blower casing and a separator casing, said separator casing having a gas outlet and a work outlet, the latter communicating with the work refrigeration casing, the latter casing having a work outlet independent of said conduit means, together with refrigeration means in the gas refrigeration casing, work conveyor means in the work refrigeration casing leading from the point of work admission thereto to the said independent work outlet in a direction opposite to the direction of gas flow through said work refrigeration casing, work comminuting means in the comminuting casing, a blower in the blower casing for the circulation of gas through the whole of said conduit means, said conduit means including means for delivering work into the work comminuting casing to be comminuted therein and entrained in gas drawn from said last mentioned casing by said blower, whereby the comminuted work will be pneumatically conveyed to the separator and cooled en route in gases previously employed for refrigeration of work in the work refrigeration casing.

8. The device of claim 7, in which the work refrigeration casing has a work delivery shoe affording communication to the work delivery casing from the separator casing and partially enclosing a portion of the work conveyor in the work refrigeration casing, said work conveyor comprising an interrupted screw having a portion within said shoe and another portion externally thereof, said portions being slightly spaced immediately adjacent said shoe, whereby to tend to maintain a seal of comminuted work at the point of delivery of such work from the shoe.

9. In a device for the refrigeration of comminuted solids, the combination of a gas conduit means comprising in series connection a gas refrigerating casing, a work refrigerating casing having a gas inlet and outlet with a work inlet near the gas outlet and a work outlet near the gas inlet, a blower casing having a gas inlet in communication with the gas outlet of the work refrigerating casing, and provided with a gas outlet, and a separator casing having a gas discharge outlet and a separate work discharge outlet, means affording communication for work delivery from the work outlet of the separator casing to the work inlet of the work refrigeration casing, refrigerating means in the gas refrigerating casing, a conveyor extending through the work refrigerating casing from the work inlet to the work outlet thereof and provided with means for its mechanical operation to propel work mechanically through the work refrigerating casing in opposition to the flow of refrigerated gases therethrough, means for introducing finely divided work into said conduit means in proximity to the gas inlet of the blower casing, a blower in the blower casing adapted to propel gas throughout said conduit means and to entrain the finely divided work introduced into said conduit means in refrigerated gas which has passed through the work refrigerating casing for the cooling of such work, whereby residual refrigeration in said gas is used to pre-cool the newly admitted material in said conduit means in the course of its pneumatic convection between the blower casing and the separator casing.

10. The combination of a gas conduit means including in series a gas refrigeration chamber, a material refrigeration chamber having a gas inlet and a gas outlet with a material inlet adjacent the gas outlet and a material outlet adjacent the gas inlet, a blower casing having a gas inlet communicating with the gas outlet of the material refrigerating chamber and having a discharge outlet, and a separator casing having a gas and material inlet with which said blower casing discharge outlet communicates, said separator casing having separate gas and material outlets, and said gas conduit means including means for introducing finely divided material into the path of gas movement between the material refrigerating chamber and the blower casing to be entrained by gas moving toward the blower casing; together with a blower in the blower casing for effecting gas movement throughout said conduit means, an intermediate refrigerating chamber comprising means for delivering material from the outlet of the separator to the material inlet of the material refrigerating chamber, refrigerating means in the gas refrigerating chamber and in said intermediate chamber, means for effecting a seal of material treated upon the delivery of such material to the material refrigerating chamber for the exclusion from said material treating casing of gas previously acting on such material, said seal effecting means including a delivery shoe and conveyor means for propelling material through the material refrigerating casing in opposition to the flow of refrigerated gas through such casing toward the material outlet therefrom.

GERALD D. ARNOLD.

CERTIFICATE OF CORRECTION.

Patent No. 2,363,282. November 21, 1944.

GERALD D. ARNOLD.

It is hereby certified that error appears in the printed specification of the above numbered patent requiring correction as follows: Page 1, first column, line 15, for the numeral "413,320" read --413,420--; and that the said Letters Patent should be read with this correction therein that the same may conform to the record of the case in the Patent Office.

Signed and sealed this 20th day of February, A. D. 1945.

Leslie Frazer (Seal) Acting Commissioner of Patents.